United States Patent [19]

Kloster

[11] 4,384,405
[45] May 24, 1983

[54] CYLINDER CUTTING TOOL

[76] Inventor: Kenneth D. Kloster, 6649 Millridge, Maumee, Ohio 43537

[21] Appl. No.: 282,527

[22] Filed: Jul. 13, 1981

Related U.S. Application Data

[63] Continuation of Ser. No. 86,784, Oct. 22, 1979, abandoned.

[51] Int. Cl.³ .......................... B23D 21/06; B26D 3/16
[52] U.S. Cl. ............................................ 30/95; 30/96; 30/101
[58] Field of Search .................... 30/101, 102, 94, 95, 30/91.2, 90.3, 90.8, 287, 96

[56]  References Cited

U.S. PATENT DOCUMENTS

| 212,256 | 2/1879 | Morse | 30/96 |
| 323,464 | 8/1885 | Strong | 30/102 X |
| 2,684,533 | 7/1954 | Kern | 30/287 X |

FOREIGN PATENT DOCUMENTS 3689  5/1878  Fed. Rep. of Germany .......... 30/96

Primary Examiner—James G. Smith
Assistant Examiner—Debra S. Meislin
Attorney, Agent, or Firm—Wilson, Fraser, Barker & Clemens

[57]  ABSTRACT

This invention relates to a cylinder cutting tool which is utilized to sever the upper end of a cylindrical housing of a factory-sealed vehicular suspension system of the type commonly referred to as a MacPherson strut suspension system. The tool includes a main body portion having a main arm, a second arm, and a clamp for supporting the tool on the piston rod of the original shock absorber for controlling the rotation of the tool. A rotatable cutting wheel assembly is slidably movable relative to the main support arm. The cutting wheel may be moved into and out of engagement with the cylinder by a suitable lead screw actuatable by rotating a hand grip mounted on the outer end of the main arm. The cutting line at which the cylinder is severed may be controlled by providing a plastic adapter element of a predetermined thickness for supporting the rotating tool on top of the cylinder.

12 Claims, 10 Drawing Figures

CYLINDER CUTTING TOOL

This is a continuation of application Ser. No. 086,784 filed Oct. 22, 1979, now abandoned.

BACKGROUND OF THE INVENTION

One type of vehicle suspension system which is becoming increasingly popular is the MacPherson strut suspension system. The MacPherson strut is an integral coil spring-shock absorber assembly which provides a lightweight, compact vehicle suspension system. The MacPherson strut suspension system is disclosed in more detail in U.S. Pat. No. 2,624,592 to E. S. MacPherson.

One of the problems associated with MacPherson strut assemblies is that the shock absorber unit typically wears out before the associated coil spring. One solution to this problem is to manufacture the MacPherson strut assembly with a construction which permits the shock absorber to be readily removed and replaced with a new shock absorber. However, this type of construction results in additional manufacturing expense. Consequently, some manufacturers produce MacPherson strut assemblies which do not readily accept replacement shock absorbers. In this type of assembly, the original equipment shock absorber unit is inserted into an associated cylinder housing which is subsequently sealed by welding or roll forming operations. The cylinder housing typically includes a coil spring support and a lower support bracket. Thus, when the shock absorber unit wears out, the vehicle owner is faced with the expense of replacing the entire cylinder housing assembly, including the coil spring support and the lower support bracket.

SUMMARY OF THE INVENTION

The present invention relates to a tool for severing the upper end of the cylinder housing in a MacPherson strut suspension system. If the original shock absorber is sealed within the cylinder, the upper end of the cylinder must be severed to provide access to the shock absorber unit to be replaced. The present invention provides a tool for effectively and accurately severing the upper end of the cylinder. The worn shock absorber is then accessible and may be readily removed and replaced with a new shock absorber.

The line at which the cylinder is severed may be determined by employing an associated adapter element for supporting the rotating tool on top of the cylinder. In the event the top surface of the cylinder to be severed is not planar, the bottom surface of the adapter is shaped to conform with the configuration of the surface on top of the cylinder. It will be appreciated that the thickness of the adapter will determine the position of the cutting element of the tool relative to the cylinder.

Accordingly, it is an object of the present invention to produce a tool capable of severing the cylinder of a sealed MacPherson strut assembly facilitating the replacement of a shock absorber.

It is another object of the present invention to effectively and accurately sever the upper end of a cylinder of a sealed MacPherson strut assembly.

Another object of the invention is to produce a tool for severing the outer wall of a cylindrical shroud member of a MacPherson type strut assembly which is readily adaptable to a myriad of sizes and configurations.

Still another object of the invention is to produce a tool for severing the wall of the cylindrical shroud member of a MacPherson-type strut assembly which is readily manufactured and may be utilized by the automotive repair industry.

The above and other objects of the invention may be typically achieved by a tool for severing cylindrical housings comprising a main body portion having means for coupling the same to a piston rod axially extending from one end of the housing for rotation about the axis thereof. The tool includes a means for severing the cylindrical housing mounted on the main body portion for selective movement toward and away from the outer surface of the cylindrical member.

BRIEF DESCRIPTION OF THE DRAWINGS

The above, as well as other objects and advantages of the invention will become readily apparent to one skilled in the art from reading the following detailed description of the invention when considered in light of the accompanying drawings, in which.

DESCRIPTION OF THE PREFERRED EMBODIMENT

Figure 1:
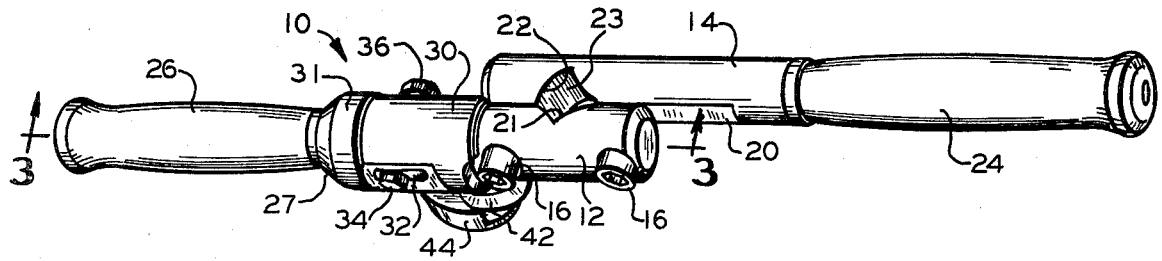
FIG. 1 is a perspective view of a cutting tool embodying the features of the present invention.
Figure 2:
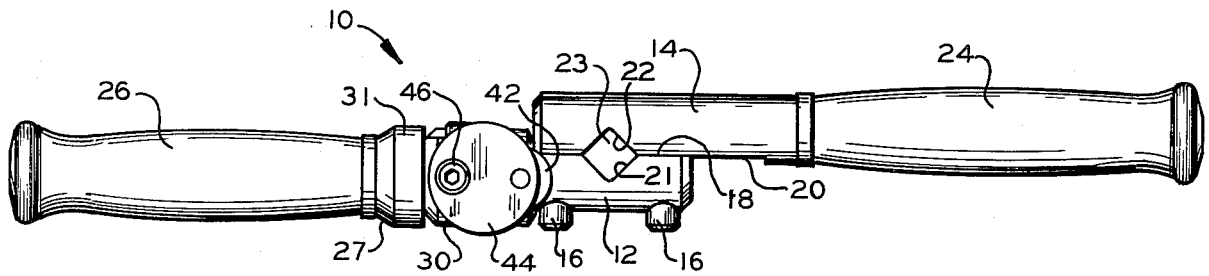
FIG. 2 is a bottom view of the cutting tool shown in FIG. 1.

Referring to FIGS. 1 through 5, there is shown a cylinder cutting tool 10 containing the features of the present invention. Specifically, the tool 10 can be utilized to sever the upper end of a cylinder housing or shroud in a sealed MacPherson strut suspension system to provide access to a worn out shock absorber. After the cylinder is severed, the worn shock absorber can be readily removed and replaced with a new shock absorber cartridge.

The cutting tool 10 includes a main body portion having a main arm 12 and an associated second arm 14. The inner ends of the arms 12 and 14 overlap and are connected together by threaded fasteners 16 extending through the main arm 12 and into the associated second arm 14. The adjacent surfaces of the arms 12 and 14 have flat portions 18 and 20, respectively formed thereon to militate against any relative movement therebetween after the fasteners 16 have been tightened. The lower surface of the inner ends of the arms 12 and 14 define a lower support surface for supporting the tool 10 on one end of a shock absorber shroud. A pair of vertical V-shaped grooves 21 and 22 are formed in the facing surfaces of the arms 12 and 14 respectively such that, when the arms are fastened together, a generally diamond-shaped aperture 23 is formed by the cooperating V-shaped grooves.

Figure 3:
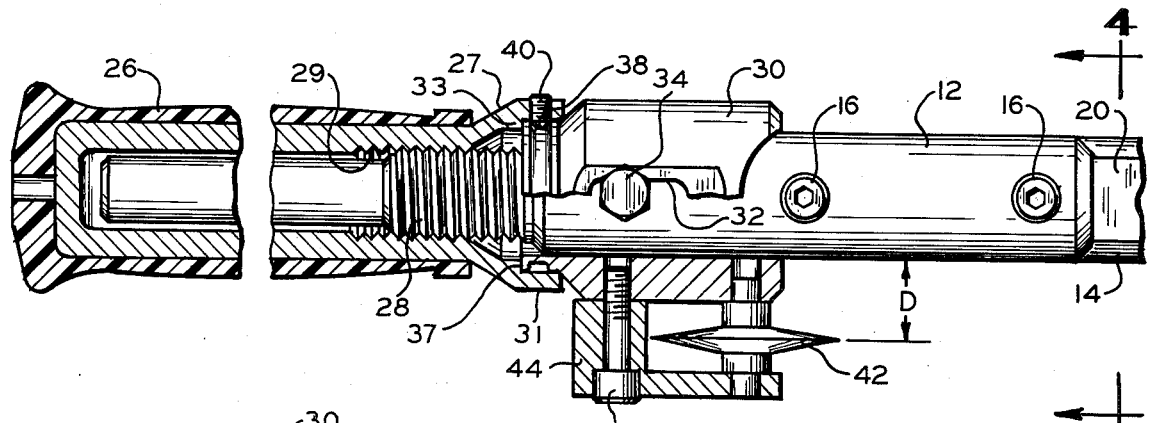
FIG. 3 is an enlarged fragmentary elevational view of the tool illustrated in FIGS. 1 and 2 with portions cutaway to clearly illustrate the structure.
Figure 4:
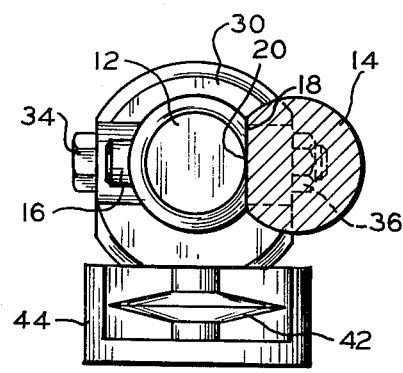
FIG. 4 is an end view taken along the line 4—4 of FIG. 3.

The arm 14 is typically provided with a hand grip 24 positioned on the outer end thereof, while the arm 12 has a hand grip 26 which is mounted on a rotatable cylindrical housing 27. As shown in FIG. 3, the outer end of the arm 12 is of a reduced diameter and has lead screw threads 28 formed thereon for engagement with internal threads 29 formed on the inner wall of the housing 27.

The rotation of the hand grip 26 and associated housing 27 will result in relative axial movement between the housing 27 and the main arm 12. As the hand grip 26 and the associated housing 27 are rotated in one direction, the cooperation between the lead screw threads 28 and the internal threads 29 moves the cylindrical housing 27 inwardly along the arm 12, and, when the hand grip 26 is rotated in an opposite direction, the housing 27 moves outwardly along the arm 12.

The cylindrical housing 27 has an enlarged flanged end 31 formed on one end thereof. The inner wall of the flanged end 31 has an annular shoulder 33 formed therein.

A slidable sleeve 30 is mounted for limited relative axial movement on the arm 12. A pair of slots 32 are formed in opposite sides of the sleeve 30. The slots 32 are formed to receive the shank portion of a bolt 34 which is adapted to extend through the slots 32 and the arm 12. A nut 36 is secured to the free end of bolt 34. The bolt 34 and the slots 32 allow for limited axial movement of the sleeve 30 relative to the arm 12 which movement is limited by the length of the slots 32. The bolt 34 and the slots 32 also function to militate against any rotative movement of the sleeve 30 relative to the arm 12.

The sleeve 30 has an end surface 37 which abuts the annular shoulder 33 of the housing 27. An outer annular groove 38 is formed adjacent the end surface 37. The groove 38 is adapted to be received within the open end of the enlarged flanged end 31 of the housing 27. A set screw 40 is mounted on the flanged end and extends inwardly into sliding contact with the groove 38.

As the hand grip 26 is rotated in one direction to advance the sleeve 30 inwardly, the sliding contact between the shoulder 33 and the end surface 37 urges the sleeve 30 inwardly along the arm 12. When the hand grip 26 is rotated in an opposite direction to retract the sleeve 30, the sliding contact between the rotating set screw 40 and the groove 38 moves the sleeve 30 outwardly along the arm 12.

A cutting wheel 42 and a shield 44 are connected to the lower side of the sleeve 30. A threaded fastener 46 extends through the shield 44 and into an internally threaded hole in the sleeve 30 to securely attach the shield 44 to the sleeve 30. The cutting wheel 42 has a pair of oppositely and outwardly extending stub shafts which are suitably received within bearing apertures in the shield 44 to enable the cutting wheel 42 to rotate about the axis of the stub shafts.

Figure 5:
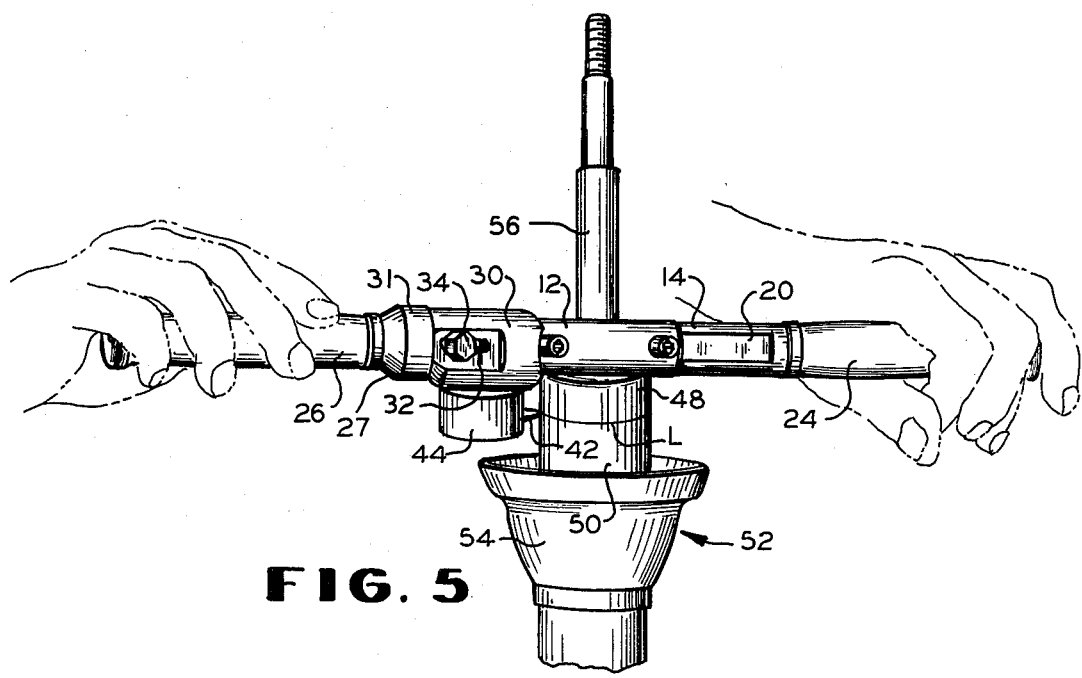
FIG. 5 is a perspective view of the cutting tool illustrated in FIGS. 1, 2, 3, and 4 in an operative position on the upper end of a cylindrical shroud of a MacPherson strut suspension system.

FIG. 5 illustrates the operation of the cutting tool 10 when utilized to sever the upper end portion 48 of a cylindrical shroud 50 of a typical MacPherson strut assembly generally indicated at 52. The strut assembly 52, as illustrated in FIG. 5, has been partially disassembled by removing the associated coil spring (not shown). A tool which can be utilized to remove the coil spring is disclosed in U.S. Pat. No. 4,034,960 to K. D. Kloster. The portion of the MacPherson strut assembly 52 shown in FIG. 5 includes a coil spring support 54 typically welded to the cylinder shroud 50. A piston rod 56 extends axially from the top of the cylindrical shroud 50.

In the operation of the tool described hereinbefore, the threaded fasteners 16 are loosened to enlarge the aperture 23 such that the piston rod 56 of the partially disassembled MacPherson strut assembly 52 can be inserted therethrough. The tool is then slid downward on the piston rod 56 such that the lower support surface of the tool rests on top of the cylindrical shroud 50. The fasteners 16 are then tightened causing the grooves 21 and 22 of the cooperating arms 12 and 14 respectively move toward one another thereby securing the tool to the outer surface of the piston rod 56. It will be appreciated that the V-shaped construction of the grooves 21 and 22 permit the tool 10 to be secured to piston rods having varying diameters.

Next, the hand grip 26 is rotated in the direction required to move the cutting wheel 42 into initial engagement with the outer side wall of the cylindrical shroud 50. The cutting tool is then rotated about the axis of the piston rod 56 which functions as the pivot therefor. Each time the cutting wheel 42 is rotated through 360° the operator can rotate the hand grip 26 to move the cutting wheel 42 into snugger engagement with the cylinder wall along the cutting line L. The rotation of the tool about axis of the piston rod 56 in conjunction with the relative axial movement of the cutting wheel 42 along the arm 12 will cause the upper end 48 of the cylindrical shroud 50 to be completely severed within a relatively short period of time.

After the severing operation has been completed, the fasteners 16 are loosened and the tool 10 and upper cylinder end 48 can be removed. At this point, the worn out shock absorber is accessible and can be removed from the cylinder 50 and replaced with a new shock absorber. The new shock absorber can be held within the cylinder 50 by utilizing a device such as a self threading nut which is disclosed in U.S. Pat. No. 4,256,421 to R. D. Kloster.

In certain instances, it may be desirous to control the location at which the cylinder is cut. One approach to this problem is to vary the length of the shoulder portions on each stub shaft of the cutting wheel 42. For example, to raise the cutting line L, a cutting wheel having a narrow upper shoulder and a longer lower shoulder would be used. However, this solution would realize the operator to change the cutting wheel each time a different cutting line is desired. Another solution would be to provide an adjustment mechanism attached to the sleeve 30 for vertically adjusting the cutting.

Figure 6:
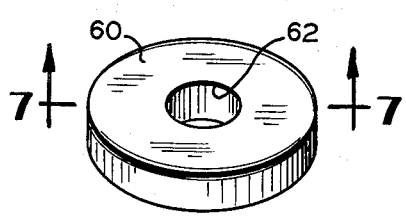
FIG. 6 is a perspective view of an adapter element utilized for determining the location of the cutting element on the associated cylindrical shroud of a MacPherson strut assembly.
Figure 7:
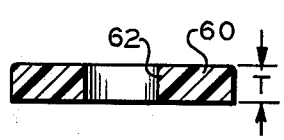
FIG. 7 is a sectional view of the adapter element illustrated in FIG. 6 taken along line 7—7 thereof.
Figure 8:
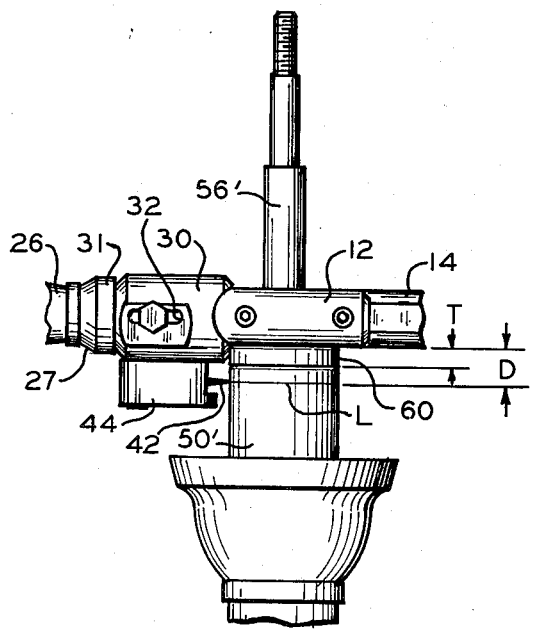
FIG. 8 is a fragmentary elevational view of the cutting tool illustrated in FIGS. 1 through 5 and the adapter of FIG. 6 shown in position of use.

A simple solution to the above mentioned problem is illustrated in FIGS. 6 through 8. A generally disc-shaped adapter element 60 is illustrated which can be employed to control the location of the cutting line. The adapter element 60 is typically constructed of a plastic material and includes a centrally disposed aperture 62. When utilized with an adapter element 60, as shown in FIGS. 6 and 7, the cutting tool 10 is constructed with a dimension D which is at least as large as the maximum cutting distance required for any given application. The tool is then utilized with the adapter element 60 having a thickness T and which has been designed for a given application.

In operation, as shown in FIG. 8, the adapter 60 is positioned such that the piston rod 56' extends through the central aperture 62 and is placed to rest on the top of cylinder 50'. The cutting tool 10 is then placed on the adapter 60. The cutting line L will then be located at a distance (D-T) below the top of the cylinder 50'.

Figure 9:
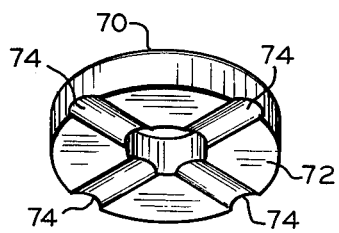
FIG. 9 is a perspective view illustrating the bottom of an adapter element having an undersurface designed to conform to the upper surface of a cylindrical shroud of a MacPherson strut assembly.
Figure 10:
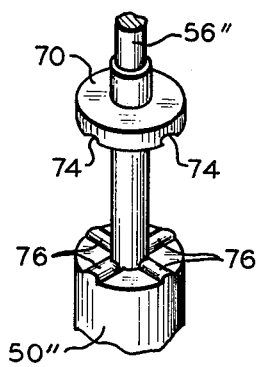
FIG. 10 is a perspective view showing the adapter illustrated in FIG. 9 positioned on the upper portion of a cylindrical shroud of a MacPherson strut assembly.

The adapter 60 illustrated in FIGS. 6, 7 and 8 has relatively flat upper and lower surfaces. This type of construction is satisfactory when the operator desires to adjust the cutting line on a cylinder have a relatively flat upper end surface. However, in some instances, the upper surface of the cylinder may be formed with ribs or other non-flat surface configurations on the upper end. Thus, if the cutting tool were placed directly on top of the cylinder, the upper surface would prevent the tool from rotating evenly to provide an even cutting line. Under these conditions, it is desirous to form the undersurface of the adapter with a configuration which generally conforms to the surface on the top of the cylinder. For example, FIGS. 9 and 10 show an adapter 70 having an undersurface 72 formed with inwardly extending groove portions 74 to receive outwardly extending ribs 76 formed on top of a cylinder 50''. Thus, the adapter 70, not only provides the operator with a means of controlling the location of the cutting line, but it also provides a flat, stable surface upon which the tool may rotate.

In accordance with the provisions of the patent statutes, the principle and mode of operation of the invention have been explained in what is considered to represent its best embodiment. It should, however, be understood that the invention may be practiced otherwise than as specifically illustrated and described without departing from its spirit or scope in accordance with the attached claims.

What I claim is:

1. A tool for severing one end of a cylindrical shroud of a shock absorber assembly, the shock absorber assembly including a piston rod axially extending from the one end of the cylindrical shroud and rotatable about the longitudinal axis of the cylindrical shroud, the tool comprising:
   an elongate main body having an axis and a lower support surface defining a shroud engaging portion whereby said main body can be supported on the one end of the cylindrical shroud;
   clamp means mounted on said main body above the lower support surface and provided with a piston rod receiving aperture aligned transversely relative to the axis of said main body, said clamp means further including adjustment means for varying at least a portion of the cross-sectional opening of the aperture to produce and maintain a clamping force generally directed to the center of the aperture whereby said clamp means can be rigidly secured to the piston rod;
   severing means mounted on said main body and including a cutting element positioned a predetermined distance below the lower support surface of said main body whereby the cylindrical shroud can be severed along a plane located a predetermined distance from the one end of the cylindrical shroud; and
   means for mounting said severing means for selective movement along the axis of said main body including a slidable sleeve mounted for axial movement on said main body, said severing means attached to and movable with said slidable sleeve, said mounting means also including a rotatable housing having internal threads formed therein for engagement with cooperating external lead screw threads formed about the axis of said main body, said rotatable housing including an annular shoulder formed therein for engaging an end surface of said slidable sleeve whereby rotation of said rotatable housing will effect relative axial movement of said slidable sleeve and said severing means along the axis of said main body toward the piston rod receiving aperture.

2. The tool defined in claim 1 wherein said main body includes a pair of oppositely extending arms.

3. The tool defined in claim 1 wherein said clamp means is securely mounted to said main body and includes a pair of grooves in facing relation to one another cooperating to define the piston rod receiving aperture.

4. The tool defined in claim 3 wherein said adjustment means includes means for moving said grooves toward and away from one another.

5. The tool defined in claim 4 wherein said means for moving said grooves includes at least one threaded shank member.

6. The tool defined in claim 3 wherein said grooves are V-shaped in cross-section.

7. The tool defined in claim 1 wherein said cutting element includes a rotatable cutting wheel having an axis of rotation generally perpendicular to the axis of said elongate main body.

8. The tool defined in claim 1 wherein said slidable sleeve includes an outer annular groove formed therein and said rotatable housing includes means for slidably engaging said groove whereby rotation of said rotatable housing in an opposite direction will effect relative axial movement of said slidable sleeve and said severing means along the axis of said main body away from the piston rod receiving aperture.

9. The tool defined in claim 1 including an adapter element having a piston rod receiving aperture formed therein and having a predetermined thickness, said adapter element having an upper surface engageable with the lower support surface of said main body and having a lower surface defining a shroud engaging portion whereby said main body and said adapter element can be supported on the one end of the cylindrical shroud.

10. The tool defined in claim 9 wherein said adapter element is generally disc-shaped.

11. The tool defined in claim 10 wherein the lower surface of said adapter element is formed with a cylindrical shroud engaging configuration.

12. The tool defined in claim 11 wherein said adapter element is formed of a plastic material.

* * * * *